Oct. 6, 1942.     E. OETIKER     2,297,797
VALVE DEVICE
Filed May 17, 1941     2 Sheets-Sheet 1

Inventor
Edwin Oetiker
By
Singer, Ehlert, Stern &
Carlberg, Attys

Oct. 6, 1942.  E. OETIKER  2,297,797
VALVE DEVICE
Filed May 17, 1941  2 Sheets-Sheet 2

Inventor
Edwin Oetiker
By
Singer, Ehlert, Stern & Carlberg
attys

Patented Oct. 6, 1942

2,297,797

UNITED STATES PATENT OFFICE 2,297,797

VALVE DEVICE

Edwin Oetiker, Zurich-Albisrieden, Switzerland

Application May 17, 1941, Serial No. 394,008

5 Claims. (Cl. 277—1)

The present invention relates to a valve device to be disposed in pipes, more particularly pipes for highly tensioned gases, air, or a fluid under pressure, said device being of the type which can be employed for engine brakes for motor vehicles. Closure devices of this kind are known, for instance from my previous Patent No. 2,090,896, in which a main valve and an auxiliary valve serving for pressure relieving are provided, the two valves being each disposed on a rotating or rocking arm which perform the adjustment of the main valve and the auxiliary valve.

The main object of the invention is to simplify the valve mechanism and to provide means to positively interconnect the main valve with the auxiliary valve.

Further objects will appear in the following description.

The invention is more particularly described with reference to the accompanying drawings, which show a cut-off device fitted in the exhaust pipe for an engine brake.

Figure 1:
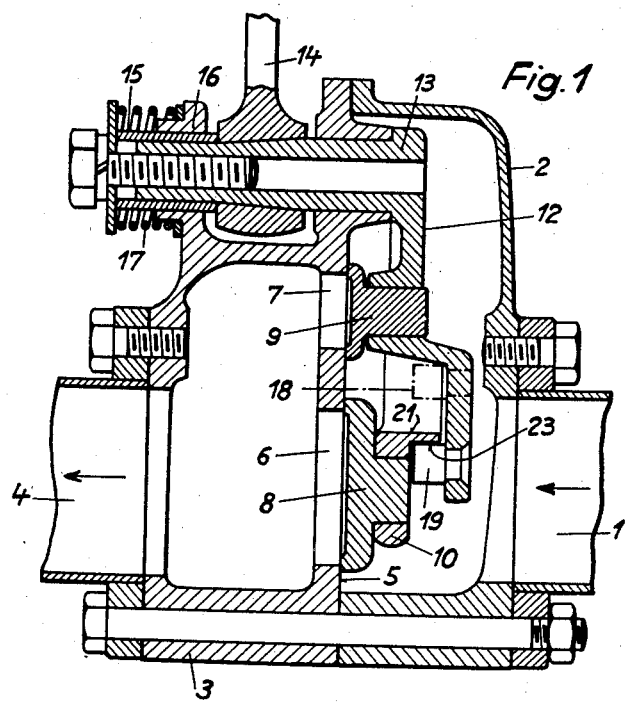
Figs. 1 and 3 are each an axial section on the lines I—I, III—III of Fig. 2.
Figure 4:
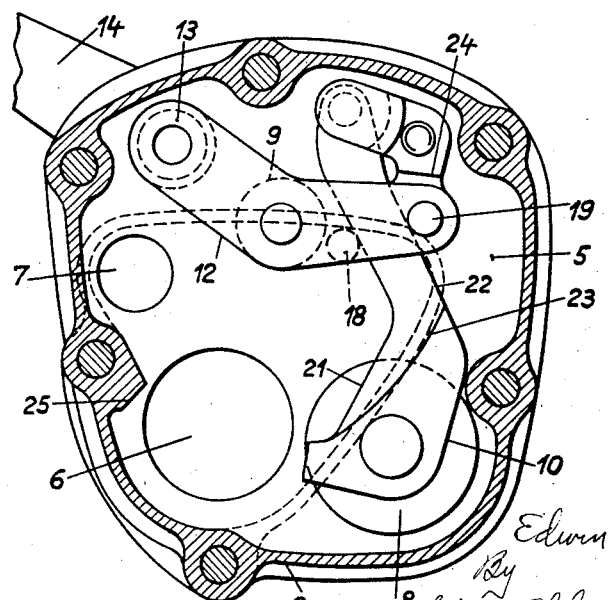
Fig. 4 is another section along the line II—II in Fig. 1.
Figure 2:
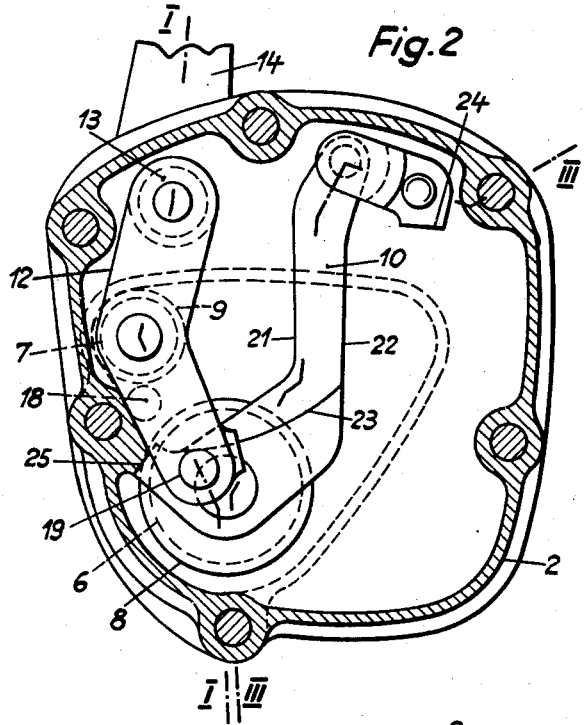
Fig. 2 is a section along the line II—II in Fig. 1.
Figure 3:
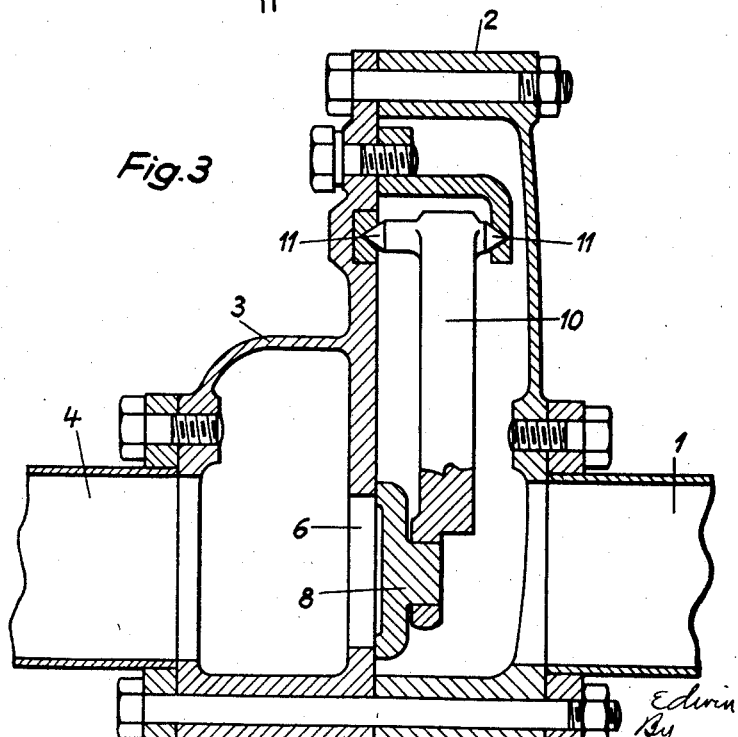

The exhaust pipe 1 opens into the cover 2 of a brake casing 3, to which casing the outlet pipe 4 is connected co-axially to the exhaust pipe 1. A slide valve face 5 is disposed in the casing 3. The valve face has a main admission passage 6 located co-axially to the pipes 1 and 4, and also a by-pass passage 7 disposed laterally thereof. The passage 6 is controlled by means of the main valve 8 and the by-pass passage 7 by the auxiliary valve 9. The main valve 8 is mounted on the rocking arm 10, which is pivoted on points at 11 in the upper portion of the casing. The auxiliary valve 9 is mounted on an actuating arm 12, which forms part of an actuating shaft 13. To the shaft 13 is secured an operating lever 14, which forms part of the brake lever gear, said gear being adjustable by hand or foot. The shaft 13 is rotatably supported at both ends, one end having a gastight seat in a bore of the casing passing through the slide valve face 5. The outer end of the actuating shaft 13 is journalled in a bush 15 seated in a lug 16 of the casing 3. A spring 17 acting on the shaft 13 tends to secure a gastight fit on the shaft 13 in the casing. Two studs 18, 19 are secured to the actuating arm 12; these studs engage cam faces 21, 22, 23 on the rocking arm 10 of the main valve 8. The shape of these cam faces is such that when the actuating arm 12 for the auxiliary valve 9 is swung for the purpose of closing the by-passage 7, the rocking arm 10 of the main valve 8 is swung about its points 11, in such a manner that the main valve 8 leads and closes the main passage 6 before the actuating arm 12 has adjusted the auxiliary valve 9 over the by-pass passage 7. Conversely, on the opening of the exhaust pipe, the auxiliary valve 9 is first moved out of the closure position by its rocking arm 12, and only after a partial opening of the by-pass passage 7 is the main valve 8 also removed from the main passage 6. Before the main valve 8 is moved away from the port of the passage 6, the auxiliary valve 9 opens the by-pass passage 7. The main valve 8 is thus already relieved of the pressure when it is adjusted.

When the main valve 8 is closed the stud 19 on the arm 12 slides along the cam face 23. The stud 19 locks the rocking arm 10, so that the main valve 8 cannot be swung out of its closure position before the actuating arm 12 has been adjusted again by the lever 14. The face 23 is a continuation of the face 22.

For limiting the movement of the actuating arm 12, stops 24, 25 are provided in the casing.

What I wish to claim and secure by U. S. Letters Patent is:

1. In a valve mechanism, a valve casing, a main pressure valve and an auxiliary pressure relief valve, in said valve casing, said casing having an inlet passage, and a partition wall provided with a main outlet passage and an auxiliary pressure relief passage, the main valve controlling the main outlet passage and the auxiliary valve controlling the auxiliary pressure relief passage, said valves being arranged for sliding movement in the same plane, a common actuating shaft for said valves, an actuating arm rigidly connected to said actuating shaft, said arm having said auxiliary valve mounted thereon, a lever pivotally mounted in said casing and having said main valve mounted thereon, and means on said arm for operatively engaging said lever, so that when said arm is rocked by the actuating shaft for closing the valve passages, the main valve is moved first into position to close the main outlet passage, whereupon the auxiliary valve is moved into its closed position to close the auxiliary passage, said means on said arm during the valve opening movement of said actuating shaft causing an actuation of said lever to move the main valve to open position after the auxiliary pressure relief valve has been opened by said actuating arm.

2. In a valve mechanism as defined in claim 1, in which said lever having said main valve mounted thereon is provided with cam faces and including studs on said actuating arm engaging said cam faces for actuating said lever positively when said arm is rocked in either direction.

3. In a valve mechanism as defined in claim 1, in which said lever having said main valve mounted thereon is provided with cam faces and including studs on said actuating arm engaging said cam faces for actuating said lever positively when said arm is rocked in either direction, the shape of said cam faces being such that when said actuating arm is rocked to move the main valve into its closing position, the studs first move said lever and lock the same when the main valve has attained its closed position.

4. In a valve mechanism as defined in claim 1, in which the lever having the main valve mounted thereon is mounted on points in said casing.

5. In a valve mechanism as defined in claim 1 including abutments within said valve casing for limiting the rocking movement of said actuating arm in both directions.

EDWIN OETIKER.